United States Patent [19]
Reilly et al.

[11] Patent Number: 5,810,135
[45] Date of Patent: Sep. 22, 1998

[54] PLUG AND SWITCH ASSEMBLY

[75] Inventors: James Reilly, Wilmington, Vt.; Paul A. Hedrick, Alexandria, Ky.; Preston D. Schultz, Canyon Lake, Calif.; Richard Gelinas, New Bedford, Mass.

[73] Assignee: General Cable Industries, Inc., Highland Heights, Ky.

[21] Appl. No.: 719,912

[22] Filed: Sep. 25, 1996

[51] Int. Cl.⁶ ................................................ H02G 11/02
[52] U.S. Cl. ...................................... 191/12.4; 191/12.2 A
[58] Field of Search ........................... 191/12.2 R, 12.4, 191/12.2 A; 439/34

[56]  References Cited

U.S. PATENT DOCUMENTS

| | | |
|---|---|---|
| 4,166,241 | 8/1979 | Grant . |
| 4,247,743 | 1/1981 | Hinton et al. . |
| 4,463,228 | 7/1984 | Osika . |
| 4,520,429 | 5/1985 | Hosking . |
| 4,579,407 | 4/1986 | Shimada . |
| 4,692,569 | 9/1987 | Winner ............................... 191/12.2 A |
| 4,730,089 | 3/1988 | Pepper ..................................... 191/12.4 |
| 4,758,175 | 7/1988 | Didier et al. ............................ 439/281 |
| 4,825,986 | 5/1989 | Pepper ..................................... 191/12.4 |
| 4,857,011 | 8/1989 | Shultz et al. ............................ 439/469 |
| 4,906,211 | 3/1990 | Bell et al. ................................ 439/851 |
| 4,973,272 | 11/1990 | Chase et al. ............................ 439/851 |
| 4,975,550 | 12/1990 | Panchisin ............................. 200/43.08 |
| 5,145,040 | 9/1992 | Fladung ............................ 191/12.2 R |
| 5,256,081 | 10/1993 | Didier ..................................... 439/464 |

OTHER PUBLICATIONS

Brochure: The Fladung 400 Hz Plug System by Manfred Fladung GmbH.

*Primary Examiner*—S. Joseph Morano
*Attorney, Agent, or Firm*—Frost & Jacobs LLP

[57]  ABSTRACT

A plug and switch assembly wherein the switch assembly is connected to a cable assembly provides convenient handling of electrical cables to supply electricity, for instance to airplanes on the ground.

21 Claims, 7 Drawing Sheets

FIG. 7

PLUG AND SWITCH ASSEMBLY

This invention relates to a plug and switch assembly. Particularly, it relates to a plug and switch assembly wherein the switch assembly is attached to a plug assembly by a cable. More particularly, the plug and switch assembly of the present invention can be used to supply electrical power to an aircraft while the aircraft is on the ground.

BACKGROUND OF THE INVENTION

When an aircraft is parked on the ground, electrical power is supplied to it via an electrical cable assembly. See FIG. 1. One end of the cable assembly is attached to an electrical power source and the other end is plugged into a receptacle in the body of the airplane. Such assemblies can be over 150 feet long and weigh in excess of several hundred pounds. Because of its size, the assembly is typically stored on a holding device. Such a device keeps it off the ground and out of the way of planes and other vehicles on the tarmac until it is needed. It also allows the assembly to be supported as it is pulled out to a waiting aircraft. This holding device can be freestanding or attached to the passenger loading bridge in some manner. When the assembly is needed to supply electricity to an airplane, it is pulled from the holding device, across the tarmac and plugged into the plane. On the passenger loading bridge or near the holding device, there is generally a switch that allows electrical power to flow through the cable assembly. There may be a second switch that releases the cable from the holding device, letting it be unwound and pulled toward the plane.

After the cable assembly has been unwound and dragged out to the aircraft, and it has been plugged into the plane, the operator must walk back to the passenger loading bridge and turn on the power. It would be much more convenient to be able to switch on the power nearer to the plug, to eliminate the need to walk back to the passenger loading bridge or holding device.

Figure 2:
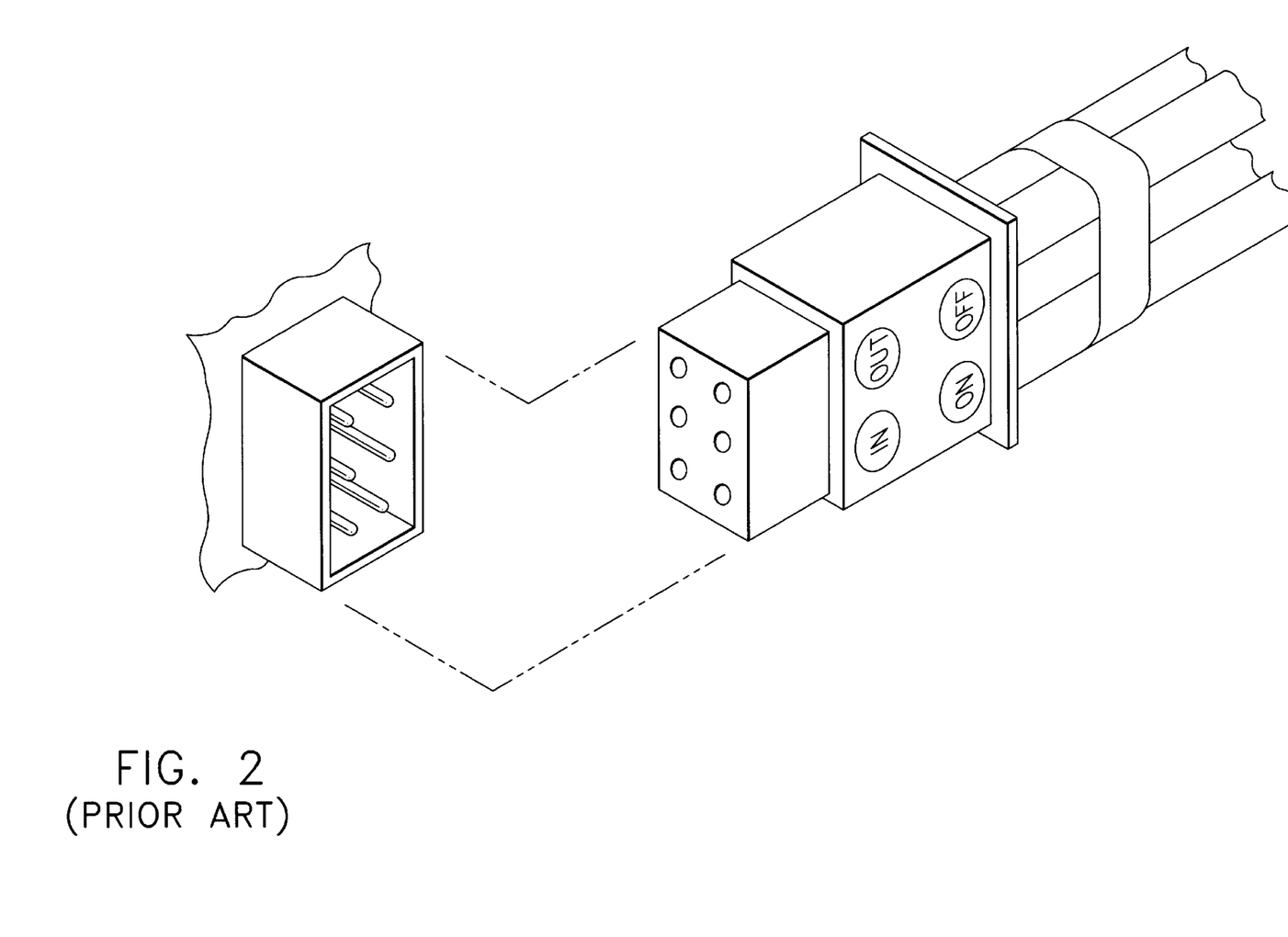
FIG. 2 is a diagram of a prior art plug assembly.

In an attempt to address this issue, plug manufacturers have produced plugs that incorporate two switches in the head of the plug. See FIG. 2. One switch releases the cable assembly so that it can be pulled from a holding device. A second switch turns the power on and off to the cable. U.S. Pat. No. 4,730,089, Pepper, issued Mar. 8, 1988, describes such a plug. This plug allows the maintenance personnel to unwind the cable assembly, and then turn on the power once they have reached the aircraft, without having to return to the passenger loading bridge or holding device.

However, this plug configuration with the switches in the plug head is still inconvenient to use. When the plug is engaged in the receptacle in the plane (a height of about five to eight feet off of the ground), the switches are not visible or easily accessible to individuals on the ground.

The present invention addresses the handling issues presented by the plugs of the prior art. The present invention provides a switch assembly that is connected to a cable assembly and controls the flow of electricity to a plug. The switch assembly is readily accessible to an operator after the plug is plugged into the plane.

The plug and switch assembly of the present invention is also less expensive to maintain. Because the switch assembly is separate from the plug and can be detachably connected to the cable assembly, a malfunctioning switch can be easily and inexpensively replaced without replacing the more expensive plug and power cable unit.

SUMMARY OF THE INVENTION

The present invention provides a plug and switch assembly comprising:

(a) a plug assembly;
(b) a switch assembly comprising a means for controlling power flow from a power source to said plug assembly;
(c) a first cable assembly with two ends, wherein the first end is attached to said power source and the second end is attached to said plug assembly;
(d) means for connecting said switch assembly to said first cable assembly such that the power controlling means controls the flow of electricity from the power source to said plug assembly, wherein said plug and switch assembly is capable of tolerating repeated cycles of being plugged into and taken out of a receptacle, and exposure to the elements.

DETAILED DESCRIPTION OF THE PREFERRED EMBODIMENT

The plug and switch assembly of the present invention may be used in any application in which it is beneficial to have a remote switch assembly attached to a plug assembly. The plug and switch assembly is particularly useful in any application that requires a rugged apparatus that can tolerate exposure to the elements and capable of tolerating repeated cycles of being plugged into and taken out of a receptacle. The assembly of the present invention is more particularly useful in supplying electricity from a power source to an aircraft on the ground.

The power source used in conjunction with the present invention includes any source of electrical power. Such power sources can include a mobile generator or the central power system of a facility, such as an airport. The electricity can be supplied as alternating current, for example 115/200V 3 phase 400 Hz, or direct current, for example 28.5 V.

Figure 3:
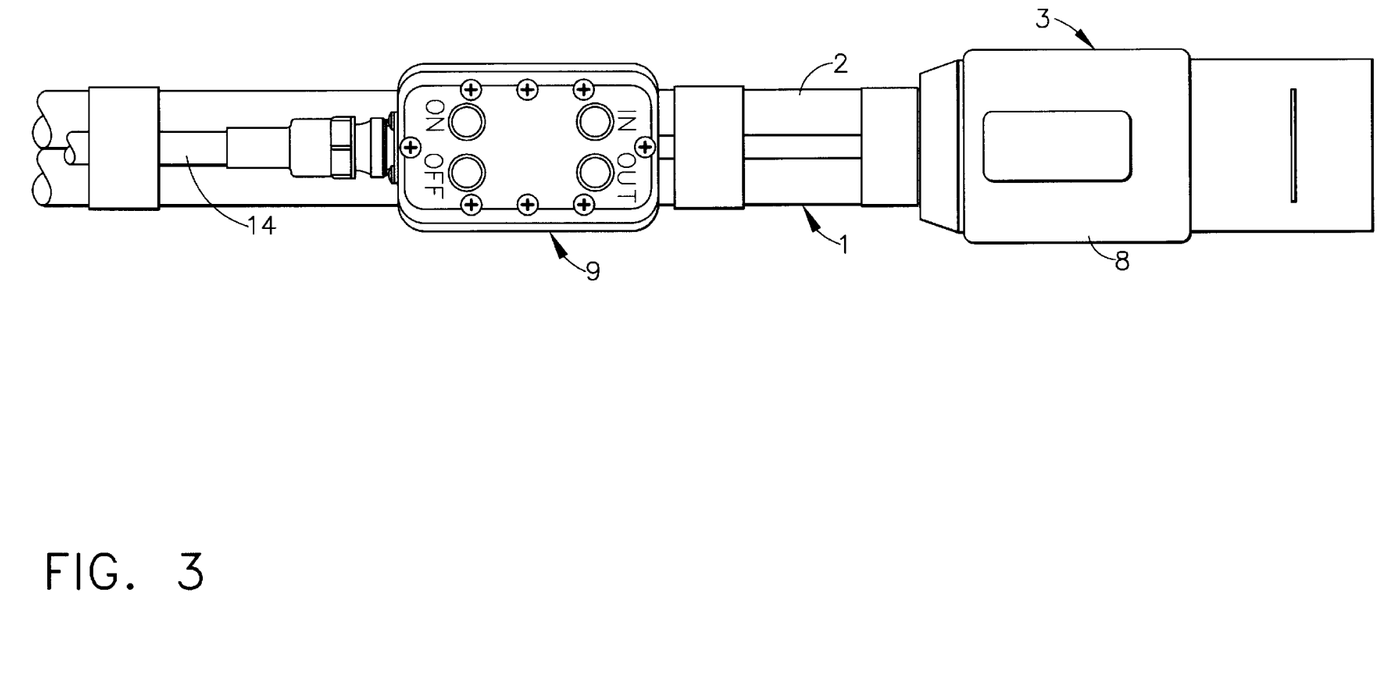
FIG. 3 is a schematic diagram of the plug and switch assembly.
Figure 4:
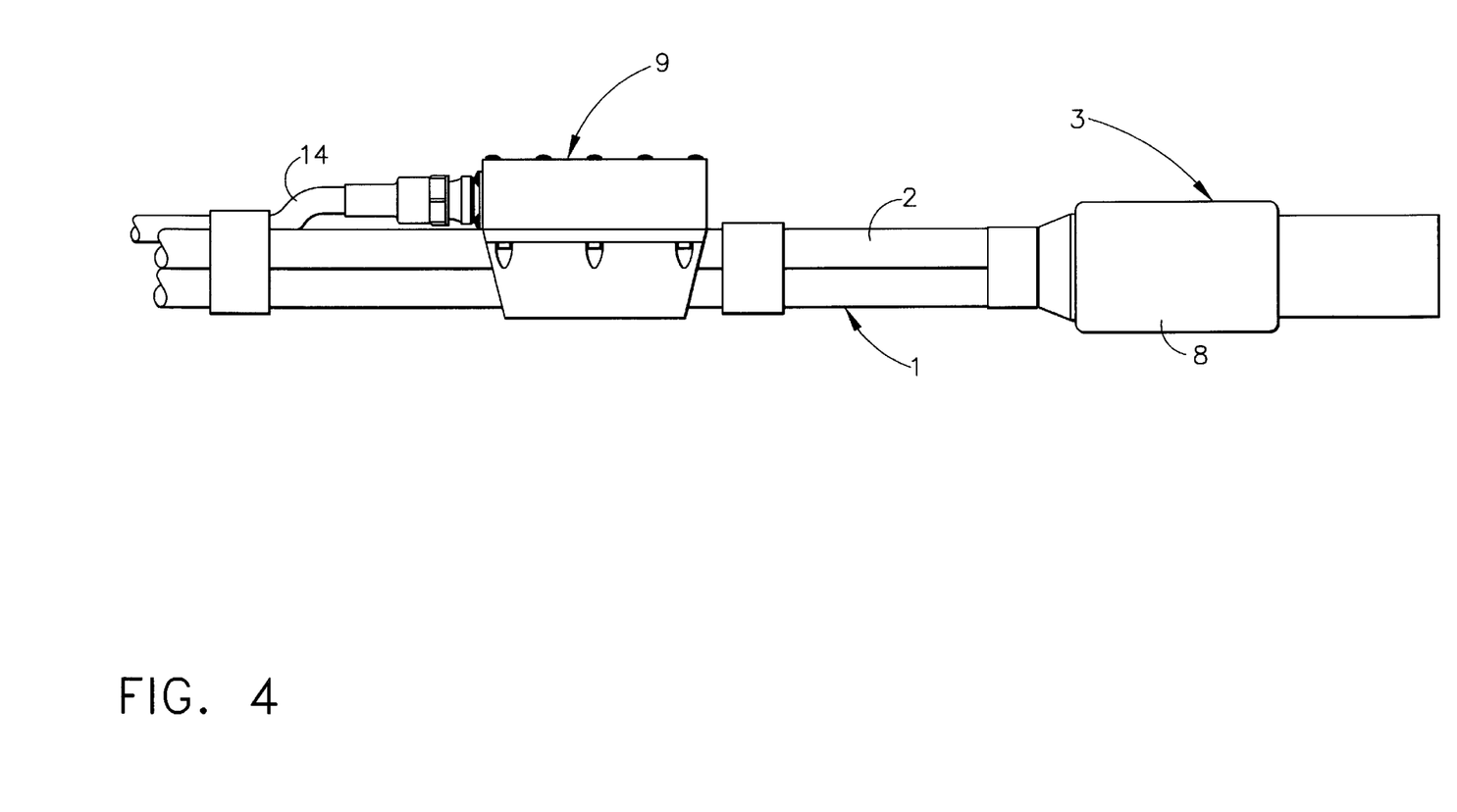
FIG. 4 is a side view of the plug and switch assembly.

As shown in FIGS. 3 and 4, the first cable assembly 1 comprises at least one conductive cable 2. The conductive cable 2 can comprise any conductive material, preferably it comprises a metallic material or a metal alloy. More preferably, the conductive cable 2 comprises copper, which is jacketed with an insulating material. Preferably, the first cable assembly 1 comprises more than one cable 2. More preferably, it comprises a plurality of parallel cables 2, each jacketed in an insulating material, and then banded together. The insulating material can include, for example, rubber or thermoplastic or thermoset elastomers.

If the first cable assembly 1 is to be used to supply alternating current (AC) power, it is most preferable that the first cable assembly 1 comprises at least four cables 2: three power cables, known as A, B and C cables, and a neutral cable. For supplying electricity to aircraft 5 on the ground, typical A, B and C cables range in size from 6 to 0000 American Wire Gauge (AWG). The typical neutral cable ranges in size from 4 to 2 AWG.

If the first cable assembly 1 is to be used to supply direct current (DC) power, it is most preferable that the first cable assembly 1 comprise at least two cables 2, with one cable carrying positive power and a second cable carrying negative power. Typically, these two cables 2 range in size from 6 to 0000 AWG.

The first cable assembly 1 may further comprise one or more low voltage switching/circuit cables. Typically, such cables are 20–10 AWG in size. In addition, the first cable assembly 1 can further comprise additional wires which carry a signal to the aircraft 5 indicating that the cable assembly 1 is plugged into the receptacle 4 of the aircraft 5. See FIG. 1.

The first cable assembly 1 must be able to withstand the amount of electricity flowing through it from the power source to the plug assembly 3 over a sustained period of time. Preferably, the first cable assembly 1 is able to withstand a sustained power of up to about 90 kVa for up to about 6 hours. In addition to being able to withstand a heavy electrical load, it is more preferable that the first cable assembly 1 be able to tolerate repeated exposure to the elements, including temperatures that range from about −60° F. to about 130° F.; subjection to fluids, such as water, diesel fuel, jet fuel, hydraulic fluid and deicing fluids; and rough handling, such as being dropped onto a hard surface, being dragged across an abrasive surface, and being run over by planes and other vehicles.

Figure 1:
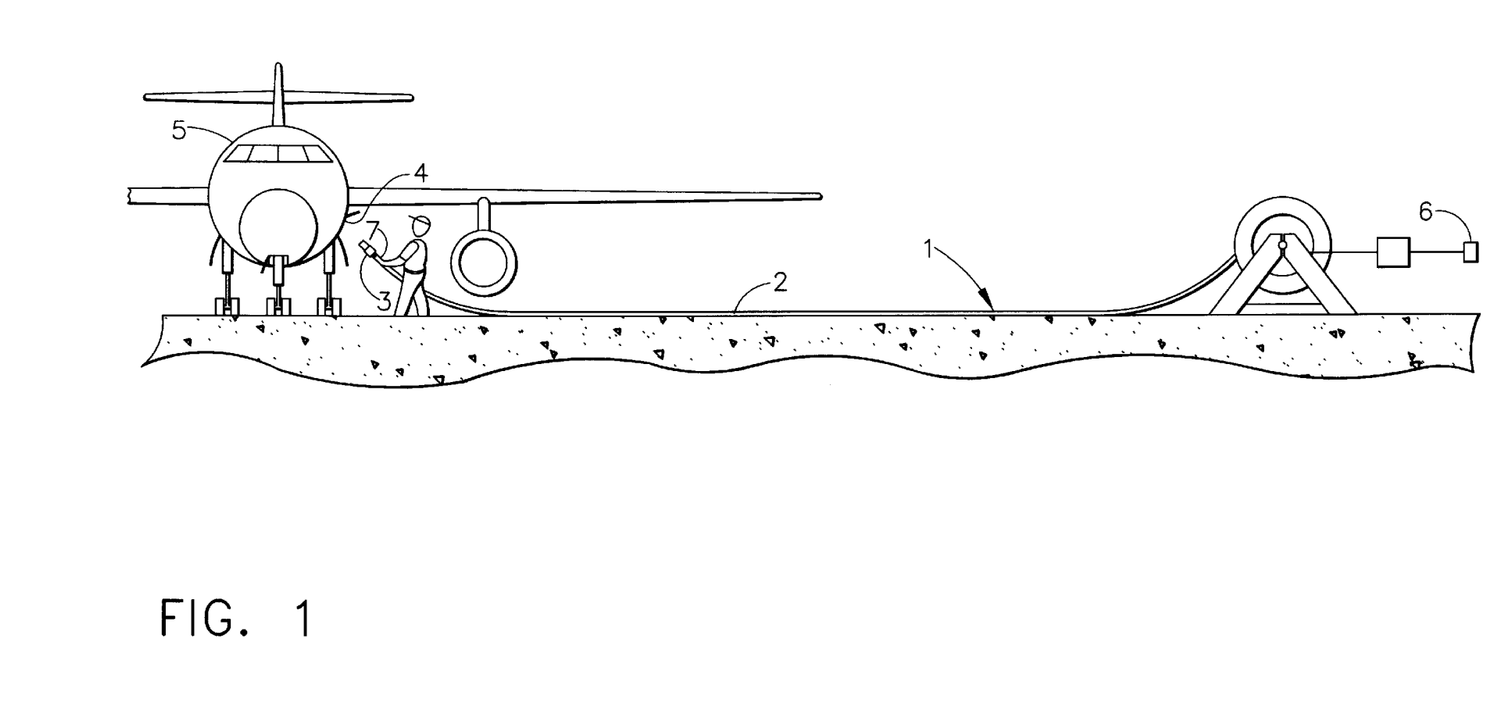
FIG. 1 is a schematic diagram of the plug and switch assembly used for delivering electricity to an aircraft on the ground.

As shown in FIG. 1, the first cable assembly 1 has a first and a second end, 6 and 7, respectively. The first end 6 is attached to the power source by connecting means. Such means can include ring terminals attached to the cable(s) 2 of the first cable assembly 1. These ring terminals can be attached to the power source with standard terminal block lugs and bolts. Other means include the use of cables 2 that are dipped in tin and inserted into a sleeve connector. The sleeve connector is mechanically compressed onto the wires with a clamping device, thereby holding the wires in the connector. The sleeve connector can be plugged into the power source.

The second end 7 of the cable assembly 1 is attached to the plug assembly 3. The plug assembly 3 can be molded onto the cable assembly 1 by molding methods such as injection molding, compression molding, or transfer molding. The plug assembly 3 can also be attached to the first cable assembly 1 by mechanical attachment means so that the plug assembly 3 can be replaced in the field. Such a field replaceable plug assemby 3 includes contacts which are crimped onto each cable 2 of the first cable assembly 1 and then inserted into the material making up the plug assembly 3.

The plug assembly 3 of the present invention comprises a plug 8 that is capable of conducting the electricity brought from the power source via the first cable assembly 1 to a receptacle 4 in a power consuming device, such as an airplane 5. The plug 8 comprises at least one connector. Such connectors are well known in the art. They typically comprise a socket in the plug 8 that receives a corresponding prong located in the receptacle 4 of the power consuming device. Suitable connectors include those described in U.S. Pat. Nos. 4,973,272, Chase et al., issued Nov. 27, 1990; U.S. Pat. No. 4,906,211, Bell et al., issued Mar. 6, 1990; U.S. Pat. No. 4,857,011, Shultz et al., issued Aug. 15, 1989; U.S. Pat. No. 5,256,081, Didier, issued Oct. 26, 1993; and U.S. Pat. No. 4,758,175, Didier et al., issued Jul. 19, 1988, all incorporated herein by reference. The number and type of connectors in the plug 8 are controlled by the requirements of the particular application. Preferably, the plug 8 conforms to the requirements of Mil-Std 7974D, or other airline industry standards. There can be more than one plug assembly 3 attached to the first cable assembly 1. Preferably, there is one plug assembly 3 attached to the first cable assembly 1.

The plug assembly 3 itself can be fabricated from any materials known in the art for use in making electrical components, including, for example, rubber or thermoplastic or thermoset elastomers. Preferably, the plug assembly 3 is fabricated from materials that can tolerate repeated exposure to the elements, including temperatures that range from about −60° F. to about 130° F.; subjection to fluids, such as water, diesel fuel, jet fuel, hydraulic fluid and de-icing fluids; and rough handling, such as being dropped onto a hard surface, being dragged across an abrasive surface, and being run over by planes and other vehicles. The plug assembly 3 of the present invention must be able to tolerate the electrical power flowing through it during a sustained period of use and the heat generated as a result of that power. For example, the plug assembly 3 can be subjected to electrical loads up to about 90 kVa for up to about 6 hours and temperatures up to about 150° F.

Preferably, the plug assembly 3 and the first cable assembly 1 meet the requirements of well-known commercial and military specifications, for example Mil-Std-7974D. More preferably, they are also capable of withstanding up to about 2500 cycles of being plugged into and taken out of a receptacle 4. Most preferably, they are capable of withstanding up to about 4000 cycles of being plugged into and taken out of a receptacle 4.

Figure 5:
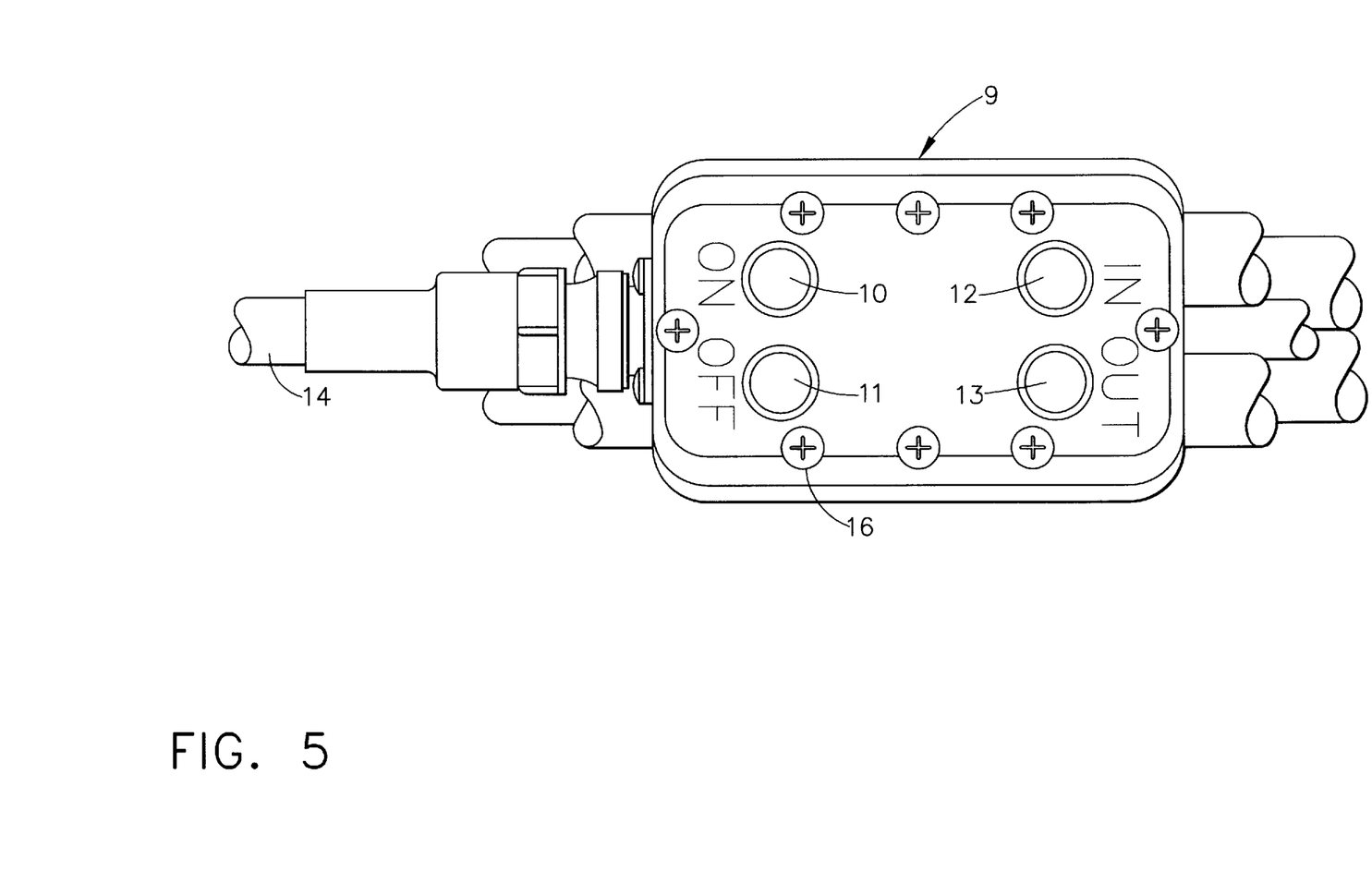
FIG. 5 is a top view of the switch assembly.
Figure 6:
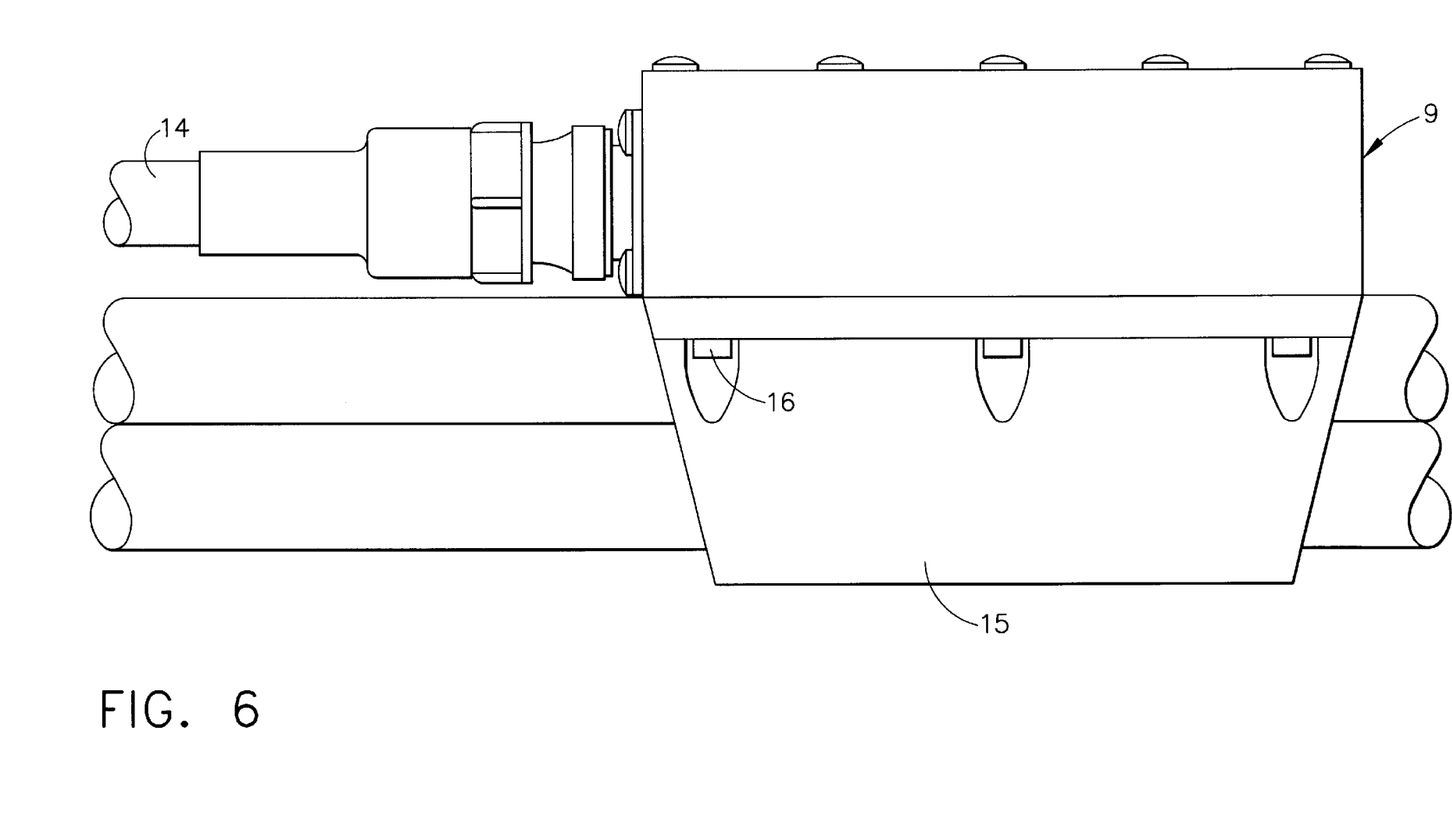
FIG. 6 is a side view of the switch assembly.
Figure 7:
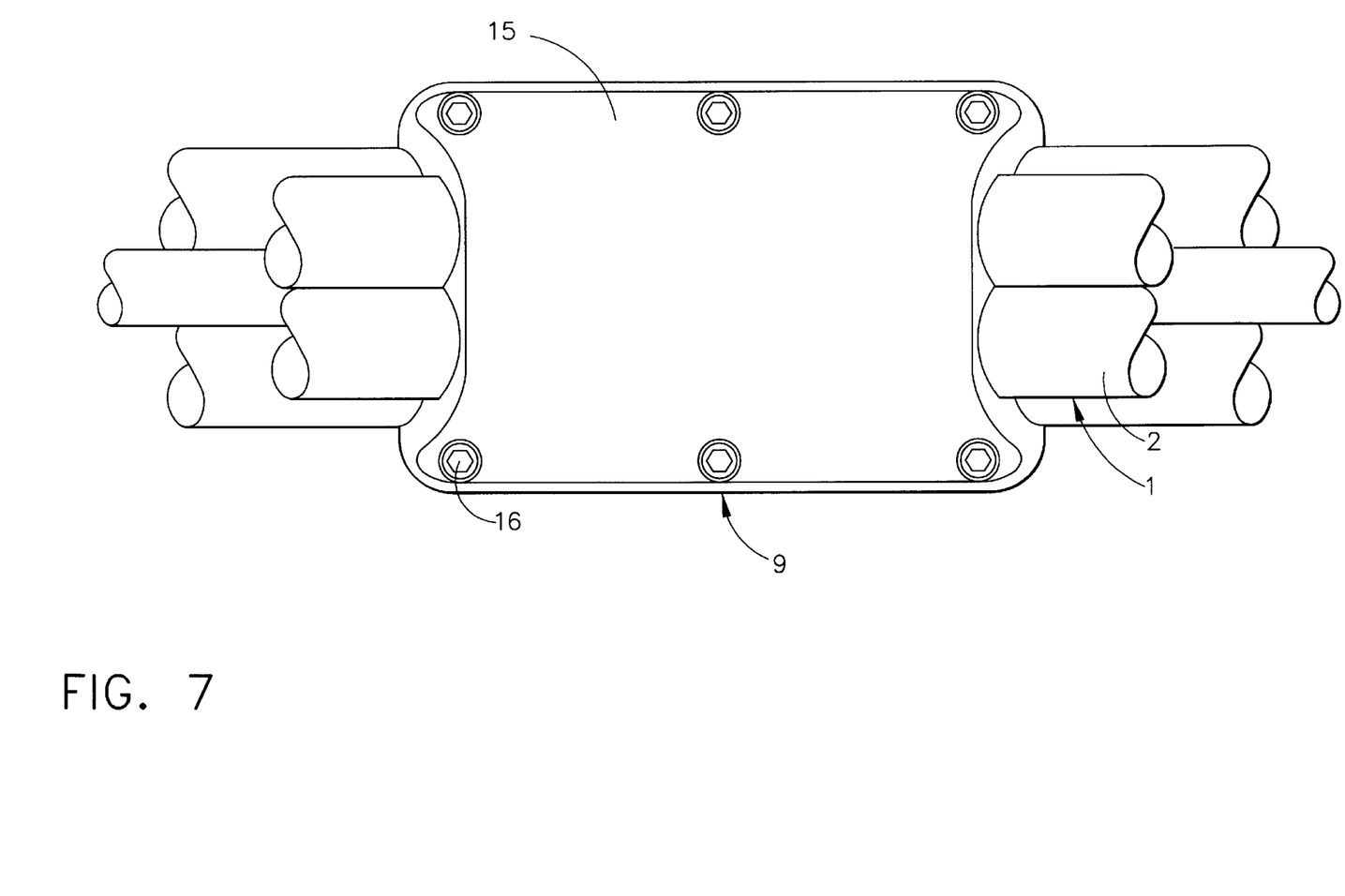
FIG. 7 is a bottom view of the switch assembly.

As shown in FIGS. 5 through 7, the switch assembly 9 comprises a means for controlling power flow from the power source to the plug assembly 3. Such controlling means can include, but are not limited to, an ON-OFF button, an ON button 10 and an OFF button 11, or means that provide for varying levels of electricity flowing to the plug assembly 3, such as a rheostat. Each switch assembly 9 can include more than one power controlling means, however, it is preferable that there be one power controlling means on the switch assembly 9. The switch assembly 9 can further comprise an indicator, which identifies whether power is flowing to the plug assembly 3. Such an indicator can include, but is not limited to, a light located on or near the controlling means that illuminates when electricity is flowing to the plug assembly 3.

Preferably, the switch assembly 9 further comprises a means for releasing the first cable assembly 1 from the holding device and for retracting the first cable assembly 1 onto the holding device. Such means can include an IN button 12 and an OUT button 13 or other means known in the art. Such means can be connected, for example, to a motor that retracts the cable assembly 1 if the cable assembly 1 is stored on a reel, or to a hoist that lifts the cable assembly 1 into the air.

More than one switch assembly 9 can be connected to the first cable assembly 1. Preferably, one switch assembly 9 is connected to the first cable assembly 1.

The switch assembly 9 can be fabricated from any materials known for use in making electrical components, including, for example, rubber or thermoplastic or thermoset elastomers. Preferably the switch assembly 9 is fabricated from materials that can tolerate repeated exposure to the elements, including temperatures that can range from about −60° F. to about 130° F.; subjection to fluids, such as water, diesel fuel, jet fuel, hydraulic fluid and de-icing fluids; and rough handling, such as being dropped onto a hard surface, being dragged across an abrasive surface, and being run over by planes and other vehicles.

The first cable assembly 1 and the switch assembly 9 must be connected in such a way that the power control means controls the flow of electricity to the plug assembly 3. The switch assembly 9 can be attached anywhere along the length of the first cable assembly 1. It can be connected in series with the plug assembly 3. Preferably, the switch assembly 9 is connected to the first cable assembly 1 via a second cable 14 having a first end- and a second end.

Such a second cable 14 comprises at least one conductive wire typically covered with an insulating material. The conductive wire can comprise any conductive material, preferably it comprises a metallic material or a metal alloy. More preferably, the conductive wire comprises copper. The insulating material can include rubber or thermoplastic or thermoset elastomers. Preferably, the second cable 14 comprises one wire. This wire is typically 20–10 AWG wire.

The second cable 14 has two ends. If a second cable 14 is used to connect the switch assembly 9 to the first cable assembly 1, the first end is connected to the first cable assembly 1 and the second end is connected to the switch assembly 9. The second cable 14 can be connected to the first cable assembly 1 anywhere along the length of the first cable assembly 1. Preferably, the first cable assembly 1 and the second cable 14 are connected to one another such that the switch assembly 9 is accessible to an operator when the plug assembly 3 is engaged in a receptacle 4 of a power consuming device. More preferably, the second cable 14 is connected to the first cable assembly 1 at the power source. It is preferable that the second cable 14 be connected to the first cable assembly 1 by intermediate means such that the second cable 14 does not directly contact the first cable assembly 1. Connecting means for connecting the first end to the power source can include, but are not limited to, ring terminals.

The switch assembly 9 can be connected to the second end by any means. The switch assembly 9 can be molded onto the second end by a molding process, such as injection molding, transfer molding, or compression molding. Preferably, the switch assembly 9 is detachably connected to the second end, so that it can be easily replaced in the field.

If the first cable assembly 1 and the second cable 14 are connected at the power source, preferably the two items are bundled together, for instance by straps or brackets, so that the two items can be handled as one. More preferably, the switch assembly 9 is also held to the first cable assembly 1 by a holding means 15, such as a bracket or a strap. The switch assembly 9 can also be molded onto the first cable assembly 1 by any molding method, such as injection molding, compression molding or transfer molding. Most preferably, the holding means 15 are detachable, for example they are held onto the switch assembly 9 by nuts and bolts 16, or screws, so that the switch assembly 9 can be easily disconnected from the first cable assembly 1 for repair or replacement.

What is claimed is:

1. A plug and switch assembly comprising:
   (a) a plug assembly;
   (b) a switch assembly, separate from said plug assembly comprising a means for controlling power flow from a power source to said plug assembly;
   (c) a first cable assembly with two ends, wherein the first end is attached to said power source and the second end is attached to said plug assembly;
   (d) means for connecting said switch assembly to said first cable assembly such that the power controlling means controls the flow of electricity from the power source to said plug assembly, wherein said plug and switch assembly is capable of tolerating repeated cycles of being plugged into and taken out of a receptacle, and exposure to the elements.

2. The plug and switch assembly of claim 1 wherein said first cable assembly comprises at least one conductive cable.

3. The plug and switch assembly of claim 2 wherein said first cable assembly comprises more than one cable.

4. The plug and switch assembly of claim 1 wherein said switch assembly is connected to said first cable assembly by a second cable having a first end and a second end.

5. The plug and switch assembly of claim 3 wherein said first cable assembly is able to withstand a sustainable power of up to about 90 kVa for up to about six hours.

6. The plug and switch assembly of claim 5 wherein said first cable assembly supplies alternating current to said plug assembly and comprises three power cables and a neutral cable.

7. The plug and switch assembly of claim 5 wherein said first cable assembly supplies direct current to said plug assembly and comprises at least two cables.

8. The plug and switch assembly of claim 5 wherein said first cable assembly further comprises at least one switching cable and at least one additional wire which carries a signal to indicate that the cable assembly is plugged into the receptacle.

9. The plug and switch assembly of claim 5 wherein said plug assembly is molded onto said first cable assembly.

10. The plug and switch assembly of claim 5 wherein said plug assembly is replaceably attached to said first cable assembly.

11. The plug and switch assembly of claim 5 wherein said switch assembly is connected to said first cable assembly by a second cable having a first end and a second end.

12. The plug and switch assembly of claim 11 wherein said switch assembly is molded onto said second cable.

13. The plug and switch assembly of claim 11 wherein said switch assembly is detachably connected to said second cable.

14. The plug and switch assembly of claim 11 wherein said first cable assembly and said second cable are connected to one another so that the switch assembly is accessible to an operator when said plug assembly is engaged in a receptacle of a power consuming device.

15. The plug and switch assembly of claim 14 wherein said first cable assembly and said second cable are connected to one another at the power source.

16. The plug and switch assembly of claim 15 wherein said switch assembly further comprises a means for releasing said first cable assembly from a holding device and means for retracting said first cable assembly onto the holding device.

17. The plug and switch assembly of claim 16 wherein said means for controlling electrical power flow is selected from the group consisting of an ON-OFF button, an ON button and an OFF button, and a rheostat.

18. The plug and switch assembly of claim 17 wherein said switch assembly further comprises an indicator to identify whether electricity is flowing to said plug assembly.

19. The plug and switch assembly of claim 17 wherein said switch assembly is attached to said first cable assembly by a means for holding said switch assembly to said first cable assembly.

20. The plug and switch assembly of claim 19 wherein said holding means are detachable holding means.

21. The plug and switch assembly of claim 20 wherein said first cable assembly and said second cable are bundled together.

* * * * *